United States Patent
Hrebicek et al.

(10) Patent No.: US 10,992,748 B1
(45) Date of Patent: Apr. 27, 2021

(54) VERIFICATION OF EVENT-BASED SYNCHRONIZATION

(71) Applicant: EMC IP Holding Company LLC, Hopkinton, MA (US)

(72) Inventors: Ondrej Hrebicek, San Carlos, CA (US); Srin Kumar, Sunnyvale, CA (US); Eric Lee, Union City, CA (US); Ashwani Verma, Pleasanton, CA (US); Andrew Rondeau, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 14/743,370

(22) Filed: Jun. 18, 2015

(51) Int. Cl.
*H04L 29/08* (2006.01)
*H04L 29/06* (2006.01)

(52) U.S. Cl.
CPC .......... *H04L 67/1095* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,024,491 B1 | 4/2006 | Hanmann | |
| 8,825,597 B1 * | 9/2014 | Houston | H04L 67/06 707/610 |
| 2003/0046415 A1 | 3/2003 | Kaijyu | |
| 2003/0074323 A1 | 4/2003 | Catan | |
| 2003/0229899 A1 * | 12/2003 | Thompson | H04N 7/17318 725/87 |
| 2005/0033760 A1 | 2/2005 | Fuller | |
| 2007/0186106 A1 * | 8/2007 | Ting | H04L 63/0815 713/168 |
| 2007/0226368 A1 | 9/2007 | Strickland | |
| 2008/0005195 A1 | 1/2008 | Li | |
| 2008/0263057 A1 | 10/2008 | Thompson | |
| 2008/0289006 A1 | 11/2008 | Hoch | |
| 2009/0157802 A1 * | 6/2009 | Kang | G06F 16/275 709/203 |
| 2010/0057892 A1 | 3/2010 | Han | |
| 2010/0057924 A1 | 3/2010 | Rauber | |
| 2010/0113072 A1 | 5/2010 | Gibson | |
| 2011/0137879 A1 * | 6/2011 | Dubey | G06F 16/2343 707/704 |
| 2011/0218963 A1 | 9/2011 | Dun | |

(Continued)

OTHER PUBLICATIONS

EMC Corporation—White Paper. "Secure, Enterprise File Sync and Share with EMC Syncplicity Utilizing EMC Isilon, EMC Atmos, and EMC VNX". Aug. 2014.

*Primary Examiner* — Younes Naji
(74) *Attorney, Agent, or Firm* — Krishnendu Gupta; Nikhil Patel

(57) ABSTRACT

Techniques to perform event-based synchronization of data are disclosed. In various embodiments, a synchronization is performed at a synchronization client, based at least in part on one or more synchronization events downloaded from a synchronization server. A result of said synchronization is verified at least in part by comparing a computed representation of synchronization set state as stored at the synchronization client with a corresponding computed representation of synchronization set state as stored at the synchronization server.

26 Claims, 9 Drawing Sheets

(56) References Cited

U.S. PATENT DOCUMENTS

| | | | |
|---|---|---|---|
| 2012/0310880 A1 | 12/2012 | Giampaolo | |
| 2013/0268491 A1* | 10/2013 | Chung | G06F 16/178 707/634 |
| 2014/0032759 A1 | 1/2014 | Barton | |
| 2014/0059185 A1 | 2/2014 | Siripurapu | |
| 2014/0067997 A1 | 3/2014 | Saabas | |
| 2014/0195485 A1* | 7/2014 | Dorman | G06F 16/178 707/624 |
| 2014/0287818 A1 | 9/2014 | Chan | |
| 2015/0074407 A1* | 3/2015 | Palmeri | H04L 63/0823 713/171 |
| 2015/0120662 A1* | 4/2015 | Dai | H04L 51/16 707/634 |
| 2015/0278323 A1 | 10/2015 | Melahn | |
| 2015/0339727 A1 | 11/2015 | Yi | |
| 2016/0088064 A1* | 3/2016 | Chen | H04W 4/60 709/204 |
| 2016/0294916 A1* | 10/2016 | Daher | H04L 51/08 |

\* cited by examiner

600

| Event # | Object | Event type | Time | Client | Event details |
|---|---|---|---|---|---|
| 1 | | | | | |
| 2 | | | | | |
| 3 | | | | | |
| 4 | | | | | |
| 5 | | | | | |
| ⋮ | | | | | |
| n | | | | | |

FIG. 6

VERIFICATION OF EVENT-BASED SYNCHRONIZATION

BACKGROUND OF THE INVENTION

File sharing systems and services have been provided to maintain synchronization among a plurality of endpoints at which a synchronized folder and/or its contents (e.g., files) may be stored. Synchronization has been performed via processing done primarily on the server side, enabling synchronization to be provided across disparate client devices and systems using relatively minimal client side software.

For example, in some prior approaches, when an opportunity to synchronize a folder or other synchronization set as stored on a client device or system arose, e.g., the client checked in with a synchronization server, the server would determine which changes the client device or system needed to send to the server, and which changes made elsewhere needed to be downloaded to the client device or system. However, at scale, such a server centric approach may strain server side resources, particularly for large synchronization sets and/or for system that must synchronize a large number of synchronization sets of files (e.g., folders) across many client devices/systems and/or end users.

BRIEF DESCRIPTION OF THE DRAWINGS

Various embodiments of the invention are disclosed in the following detailed description and the accompanying drawings.

FIG. 6 is a block diagram illustrating an example of a data structure to store a synchronization event stream in an embodiment of a file sharing system.

DETAILED DESCRIPTION

Figure 1:
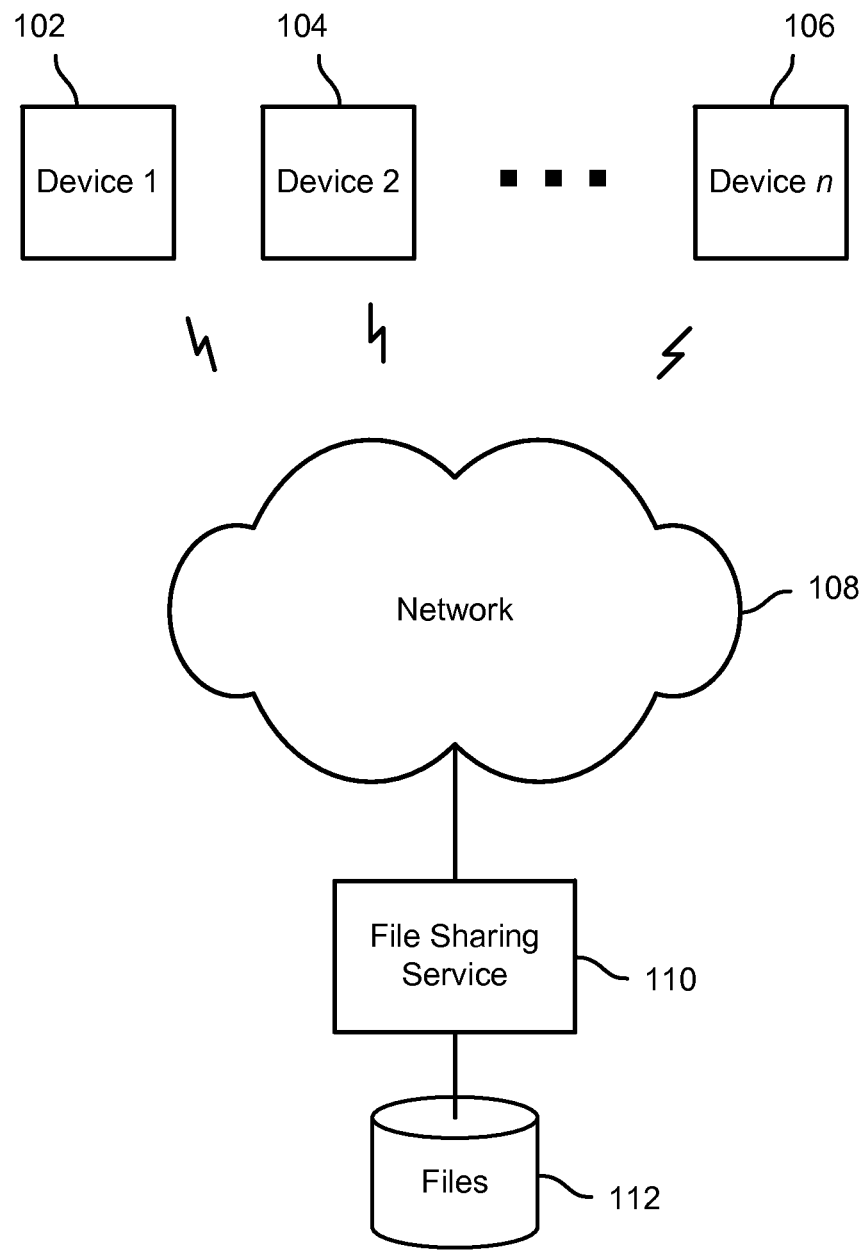
FIG. 1 is a block diagram illustrating an example embodiment of a file syncing and sharing system and associated client devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Verification of synchronization as performed by a synchronization client based on a synchronization event stream is disclosed. In various embodiments, an independently modifiable master copy of a file management system object (e.g., a file or folder) associated with a synchronization point may be stored and maintained at each of a plurality of endpoints associated with the synchronization point. For example, in some embodiments a master copy of each object may be stored at each of one or more on site or off premises client systems and/or devices associated with each of one or more users with which the synchronization point is associated. In various embodiments, a client application and/or other (e.g., browser executable) client side code at each respective endpoint is configured to maintain the copy of each synchronization point object as stored at that endpoint in synchronization with corresponding copies as stored at other endpoints associated with the synchronization point.

In various embodiments, a central/remote synchronization server tracks changes as made at respective endpoints and which are required to be propagated to other endpoints, and generates a stream of synchronization events associated with the synchronization point. Client code running on the respective endpoints associated with the synchronization points is configured to check the synchronization event stream, e.g., periodically, opportunistically, in response to events, as configured, etc., and to download synchronization events that require synchronization processing to be performed with respect to synchronization point objects as stored at that endpoint.

In various embodiments, verification is performed, e.g., periodically, in response to a trigger or event, etc., to ensure the synchronization client has received and processed without error all synchronization events required to maintain synchronization. If not, differences are determined and synchronized to/with the client.

FIG. 1 is a block diagram illustrating an example embodiment of a file syncing and sharing system and associated client devices. In the example shown, a plurality of client devices, represented in FIG. 1 by devices 102, 104, and 106, connect via a network 108 to a file sharing service 110 configured to provide managed access, via share operations defined by users, to files stored in a file storage system and/or device 112. In some embodiments, client devices such as devices 102, 104, and 106 each have installed thereon a client application or other client side code configured to provide access to services provided by the file sharing service 110. Examples of such services may include, in various embodiments, operations to share a file and/or folder with one or more other specific users and/or groups of users, and operations to view and/or access files and folders that have been shared by other users with a user of the mobile device. In some embodiments, file sharing service 110 comprises the EMC® Syncplicity® file sharing service.

Figure 2:
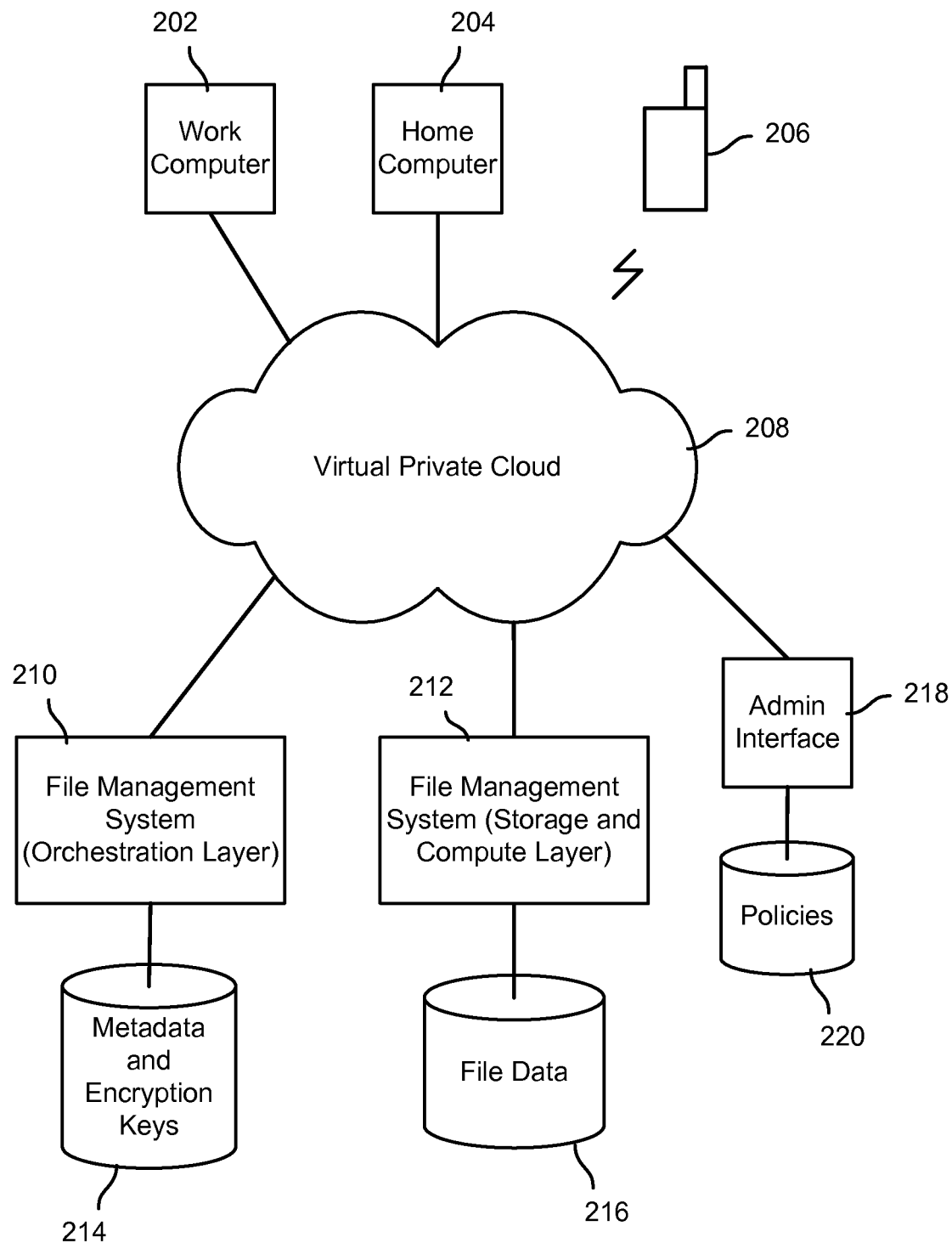
FIG. 2 is a block diagram illustrating an embodiment of a file management system.

FIG. 2 is a block diagram illustrating an embodiment of a file management system. In the example shown, content that is created, modified, deleted, etc. by one or more users of computers 102 and 104 and mobile device 106 is managed as part of a virtual private cloud 208 by a file management system that includes an orchestration layer 210 and a storage and compute layer 212. In various embodiments, a synchronization point instance may be created to manage files across disparate storage systems, including without limitation the computers 102 and 104, mobile device 106, as well as file servers and web/cloud based solutions. The orchestration layer 210 uses metadata stored and (optionally) encryption keys stored in a metadata and encryption key store 214 to manage files included in a synchronization point. Files are stored and managed "in place" at the various endpoints at which the user(s) of the synchronization point have configured them to reside. Each endpoint has a master copy of each file it is configured to store, and the locally stored file is synchronized to propagate to other endpoints changes that are made to the local copy and to update the local copy to reflect changes made at other endpoints. At file creation and/or as updates are made at various endpoints, file content data and/or changes thereto are uploaded to the storage and compute layer 212, which performs bulk data transfers and storage, and associated processing such as encryption and compression. Storage and compute layer 212 stores file data in a file data store 216, which in some embodiments may include any backend storage suitable to store large amounts of data. Using an administrative interface 218, such as a web-based interface, IT administrators can define and store in a policy store 220, and to configure the file management system to apply and enforce, file management policies, including in various embodiments and without limitation one or more of retention policies, access restrictions (e.g., restricting access to enterprise data and/or selected data depending on user/device location), security policies to limit sharing to authorized enterprise users, etc.

Figure 3:
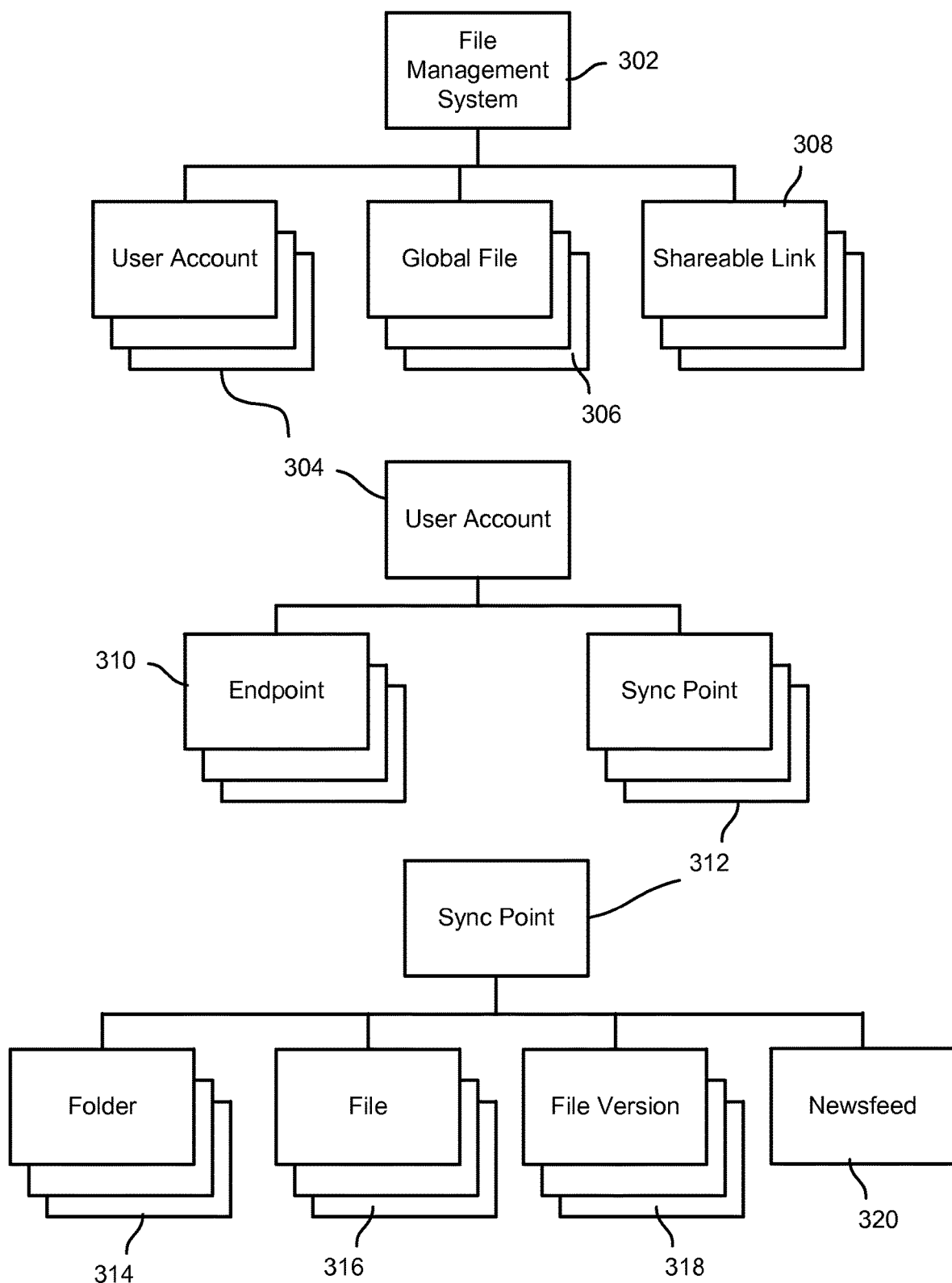
FIG. 3 is a block diagram illustrating an embodiment of a set of data structures representing entities comprising a synchronized file management system.

FIG. 3 is a block diagram illustrating an embodiment of a set of data structures representing entities comprising a synchronized file management system. In the example shown, the file management system 302 may include a plurality of user accounts 304, a plurality of global files 306, and a plurality of shareable links 308. Each user account 304 may have associated therewith one or more endpoints 310 and one or more synchronization points 312. In some embodiments, shareable lines 308 may be associated with user accounts 304. Each synchronization point 312 may include one or more folders (or subfolders) 314, a plurality of files 316, each file having one or more file versions 318, and/or a newsfeed 320 to propagate events and other information among nodes included in the synchronization point instance. In various embodiments, tables or other data structures may be created and stored to track and manage data values representing the entities shown in FIG. 3.

Event-based synchronization of objects stored in a multi-master, non-transaction file management system is disclosed. In various embodiments, a synchronization server propagates file management system object changes to endpoints associated with a synchronization point (e.g., a shared folder) with which the changed object is associated at least in part by generating and maintaining synchronization event stream. Client code running on the respective endpoints is configured to check the synchronization event stream and to use information in events comprising the stream to synchronize files, folders, and metadata as stored on the endpoint as required to become and remain synchronized with the global/authoritative state of the objects and metadata comprising the synchronization point.

Figure 4:
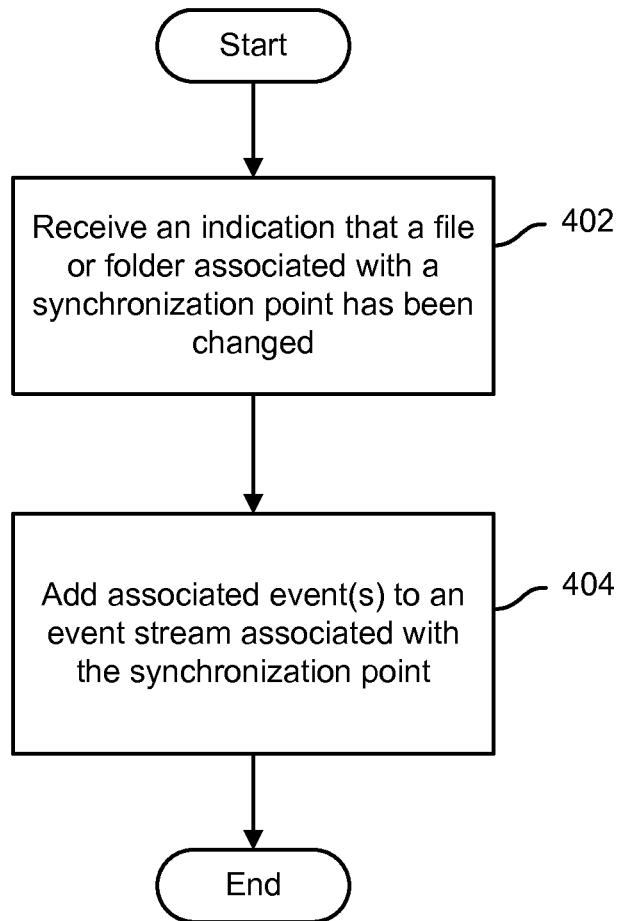
FIG. 4 is a flow chart illustrating an embodiment of a process to provide an event stream associated with a synchronization point.

FIG. 4 is a flow chart illustrating an embodiment of a process to provide an event stream associated with a synchronization point. In various embodiments, the process of FIG. 4 may be performed by a synchronization server, such as file syncing and sharing service 110 of FIG. 1 or file management system servers 210 and/or 212 of FIG. 2. In the example shown, an indication is received that a file or folder (or other object or information) associated with a synchronization point has been changed, e.g., at one of a plurality of endpoints (client systems and/or devices) associated with the synchronization point (402). For example, client code running on the endpoint may have provided the indication, e.g., in response to the object having been saved in modified form at the endpoint. A corresponding synchronization event is created and added to an event stream associated with the synchronization point (404). For example, a list, table, or other data structure may be updated to include the synchronization event. In various embodiments, synchronization events may be identified by a sequential number and/or other unique identifier, such as a monotonically increasing sequence number. In various embodiments, the event sequence numbers and/or other sequential identifiers may be used by client software to determine whether new events have been added to the event stream since that client last downloaded events, and if so which ones need to be downloaded by that client.

Figure 5:
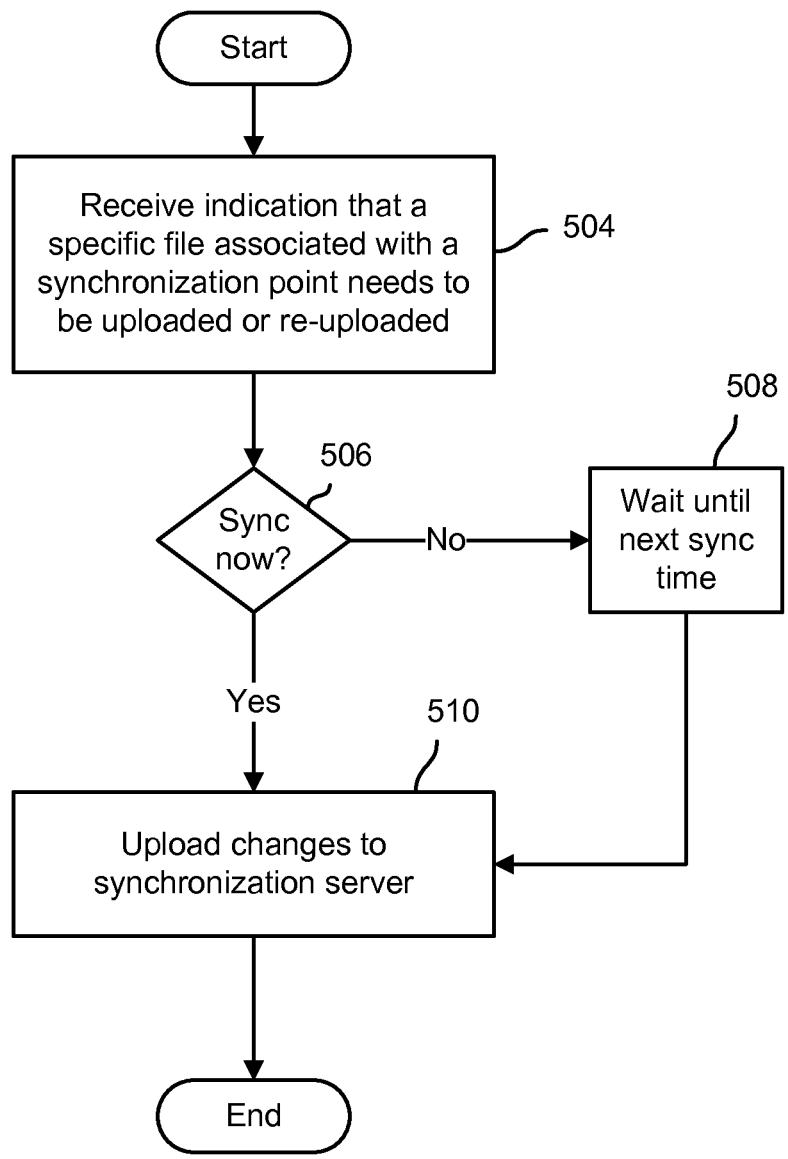
FIG. 5 is a flow chart illustrating an embodiment of a process to upload file system objects at an endpoint.

FIG. 5 is a flow chart illustrating an embodiment of a process to upload file system objects at an endpoint. In various embodiments, the process of FIG. 5 may be performed by client side code, such as a synchronization client application and/or script, running on a client system or device associated with a synchronization endpoint, such as devices 102, 104, 106 of FIG. 1 and/or clients 202, 204, 206 of FIG. 2. In some embodiments, client side execution of the process of FIG. 5 results in the indication of step 402 of FIG. 4 being received at the server side. In the example shown in FIG. 5, a server informs the client that a specific file, which is known to reside on the client device, needs to be uploaded (504). This can happen if, for example, the file was found to be corrupt on the server. If the client application/code is configured to immediately synchronize the file (506), and/or upon the next time and opportunity that the client side code is configured to synchronize files at the client (508), the files at the client are uploaded to the synchronization server (510).

FIG. 6 is a block diagram illustrating an example of a data structure to store a synchronization event stream in an embodiment of a file sharing system. In various embodiments, data structures such as the event stream table 600 of FIG. 6 may be used to store a synchronization event stream generated and maintained by a synchronization server, as in the process of FIG. 4. In the example shown, synchronization event stream table 600 includes for each sequentially numbered synchronization event in the stream a corresponding row in which the following data values are stored, each in a corresponding column of table 600: event sequence number; object (e.g., file) affected; event type (e.g., file contents modified, file/folder name changed, etc.); a time associated with the event (e.g., when the change occurred, was reported, and/or associated event was added to the stream); a client device/system/endpoint with which the event is associated (e.g., endpoint at which change was made and/or from which change was reported); and event details (e.g., name-value pairs for modified attributes, pointers to object content data as modified, etc.).

In various embodiments, a client code running on an endpoint may be configured to use data stored in synchronization event stream table 600, as stored at the synchronization server, to determine whether events have been added since a last time the client downloaded events, and if so which ones. For example, a synchronization client may query the synchronization server to determine a last used (added) event sequence number. If the number is greater than the last event sequence number processed by the client, in some embodiments the client may submit additional queries to determine which, if any, of the newly-added events should be requested for download by and to that client.

Figure 7:
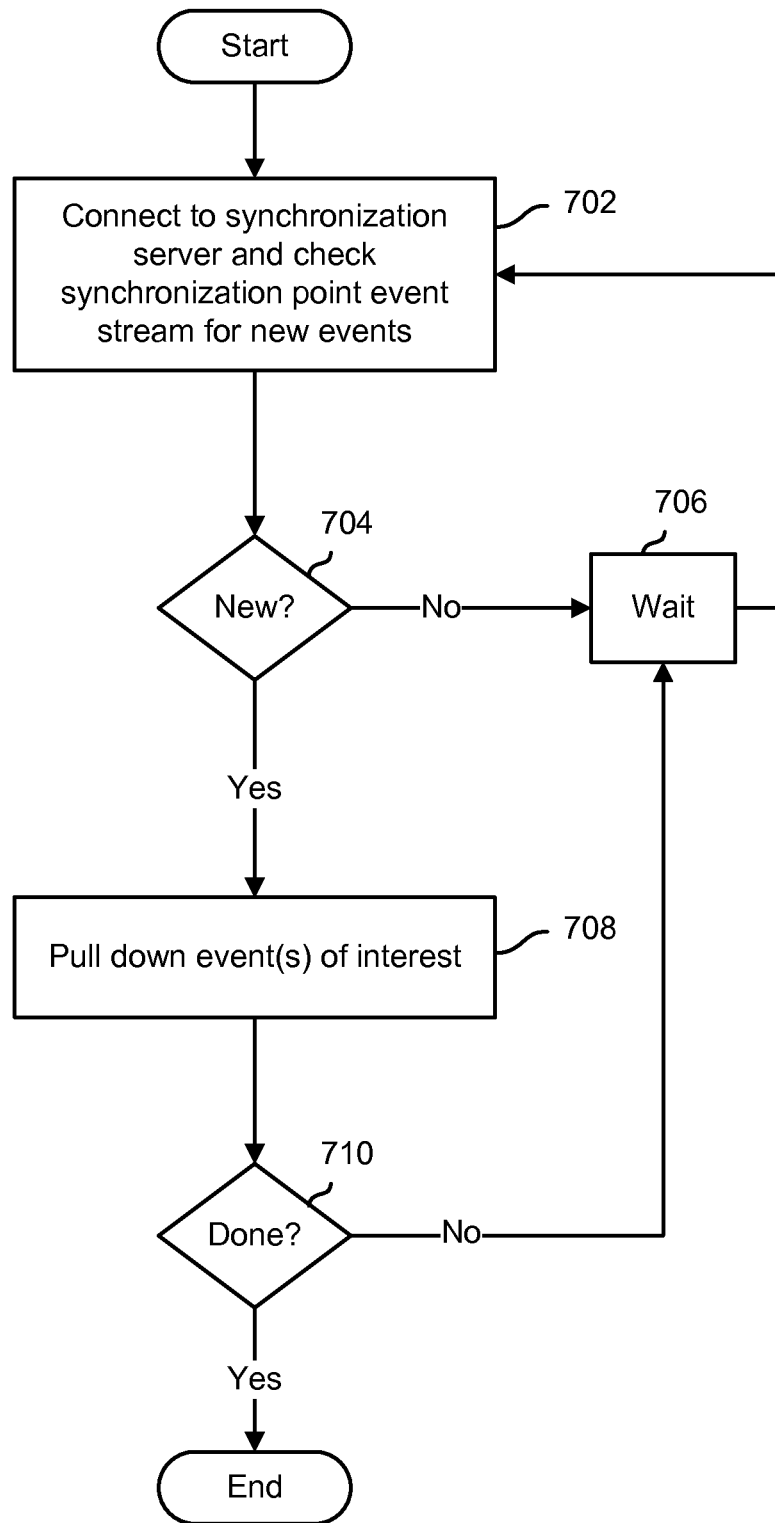
FIG. 7 is a flow chart illustrating an embodiment of a process to download synchronization events to an endpoint.

FIG. 7 is a flow chart illustrating an embodiment of a process to download synchronization events to an endpoint. In various embodiments, a synchronization client application or other client side synchronization code may be configured to perform the process of FIG. 7, e.g., client code running on client systems and/or devices, such as devices 102, 104, 106 of FIG. 1 and/or clients 202, 204, 206 of FIG. 2. In the example shown, the client side code connects to the synchronization server and checks to determine if the synchronization event stream associated with a synchronization point with respect to which the client is a participating endpoint includes any synchronization events that were added since a last time the client checked for and/or downloaded events in the stream (702). If there are no new events (704), the client waits a prescribed interval (e.g., admin user configurable, hard coded, dynamically determined based on conditions, location, etc.) (706) and checks again (702). If there are events in the synchronization event stream that the client has not yet downloaded (704), the client identifies and pulls down (e.g., requests from the server) events of interest to that client (708). For example, the client may request only a subset of events relating to synchronization point objects with respect to which the client has been configured to maintain synchronization. Once new events have been downloaded (710), the client will wait a prescribed interval and/or for occurrence of a prescribed event (706) before checking again (702). The process continues until done (710), e.g., the client is no longer an endpoint participating in the synchronization point.

Verification of synchronization as performed by a synchronization client based on a synchronization event stream is disclosed.

Figure 8:
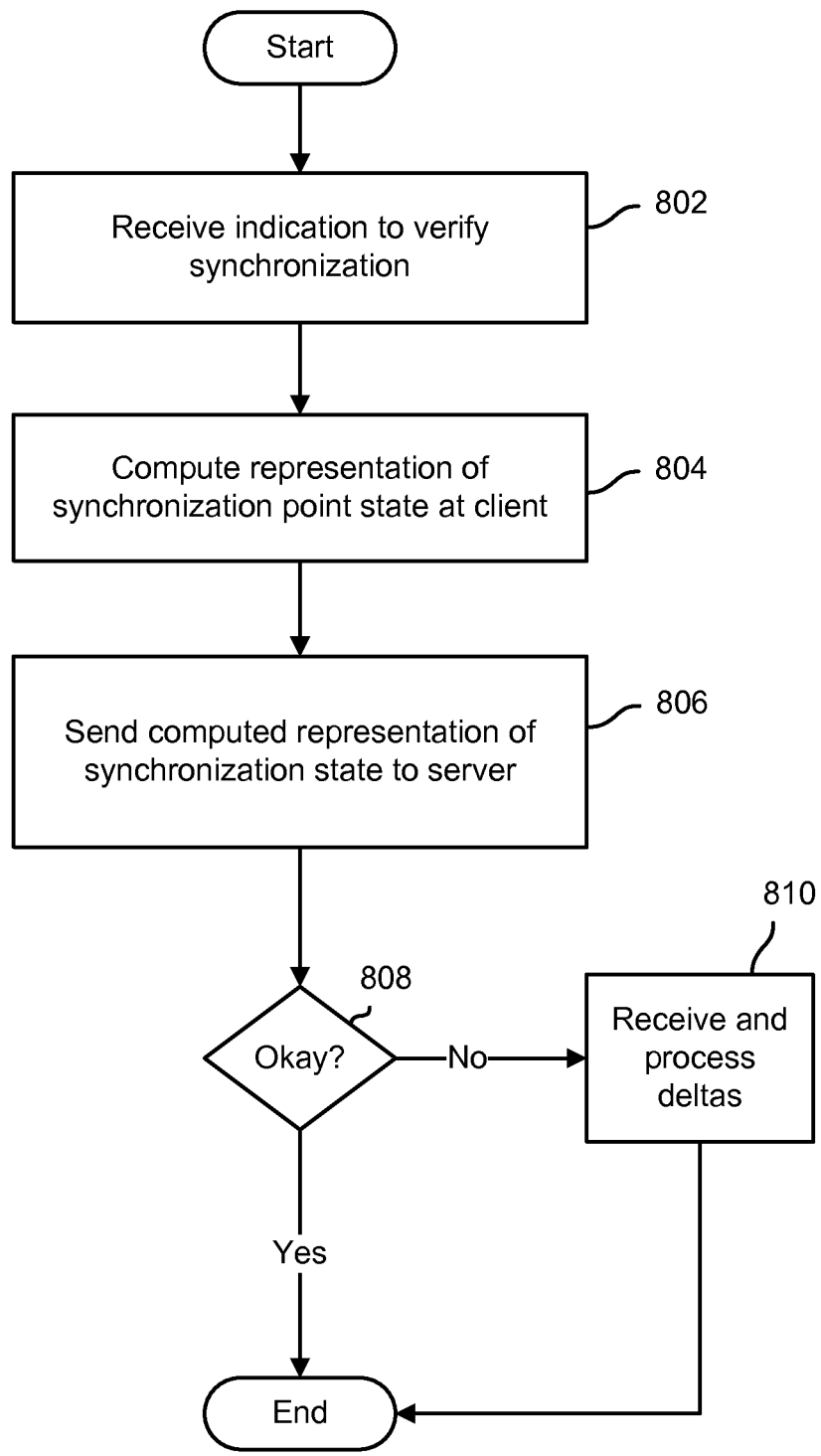
FIG. 8 is a flow chart illustrating an embodiment of a client side process to verify synchronization of synchronization point-related data.

FIG. 8 is a flow chart illustrating an embodiment of a client side process to verify synchronization of synchronization point-related data. In various embodiments, a synchronization client application or other client side synchronization code may be configured to perform the process of FIG. 8, e.g., client code running on client systems and/or devices, such as devices 102, 104, 106 of FIG. 1 and/or clients 202, 204, 206 of FIG. 2. In the example shown, an indication to verify synchronization is received (802). For example, a synchronization client configured to perform event-based synchronization as described herein may determine that a prescribed (e.g., configured) amount of time has passed since a last verification. A representation of synchronization point (e.g., synchronization folder or other set) state as stored at the client is computed (804). For example, for each file, folder, or other object, a hash or other representation may be computed. In some embodiments, file and/or folder metadata may be gathered and packaged, such as last modified date/time, etc. The representation(s) is/are sent to a synchronization server (806). In various embodiments, the synchronization server may be configured to compare such representation(s) of synchronization state as received from synchronization clients to corresponding synchronization state information reflecting the state of the synchronization set as stored at the synchronization server, and to flag and resolve any differences. In some alternative embodiments, the client requests and receives from the server a representation of the state at the server and performs the comparison locally.

Referring further to FIG. 8, if the synchronization server responds that the synchronization state is verified and no further or corrective synchronization (e.g., change recovery) operations need to be performed (808), the process ends. However, if there are discrepancies (808), the synchronization client exchanges with the synchronization server information required to resolve the differences and any updates required to be provide to and/or downloaded from the server are completed (810), after which the process ends.

Figure 9:
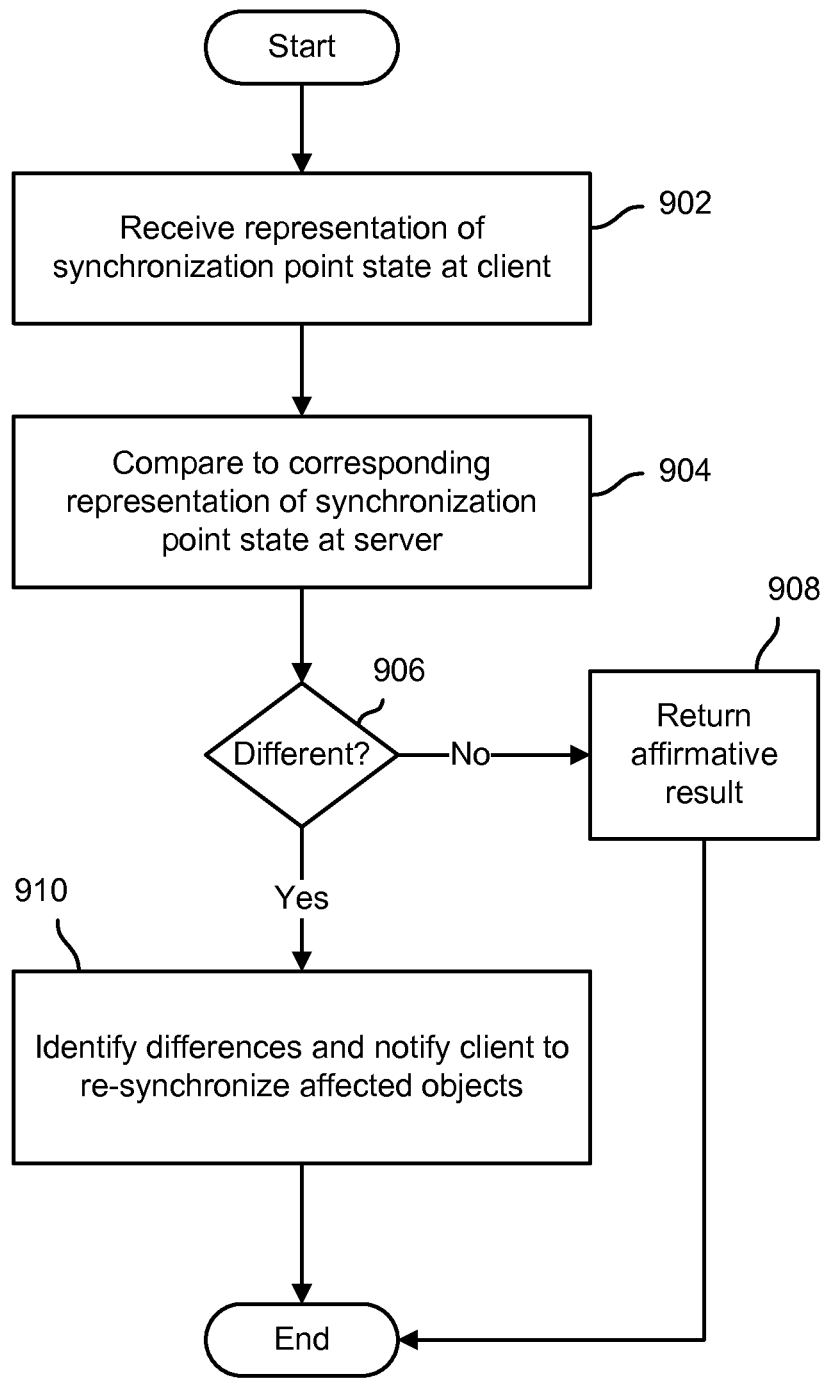
FIG. 9 is a flow chart illustrating an embodiment of a process to verify synchronization of synchronization point-related data.

FIG. 9 is a flow chart illustrating an embodiment of a process to verify synchronization of synchronization point-related data. In various embodiments, the process of FIG. 9 may be performed by a synchronization server, such as file sharing service 110 of FIG. 1 or file management system servers 210 and/or 212 of FIG. 2. In some embodiments, all or part of the process of FIG. 9 may be performed by a synchronization client application or other client side synchronization code may be configured to perform the process of FIG. 8, e.g., client code running on client systems and/or devices, such as devices 102, 104, 106 of FIG. 1 and/or clients 202, 204, 206 of FIG. 2. In the example shown, a representation of synchronization point (e.g., folder, set) state at a synchronization client (endpoint) is received (902). The received representation of synchronization set state at the client is compared to a corresponding representation of synchronization set state of the synchronization set as stored at the server (904). If there are no differences (906), the an indication is provided that the verification has been completed successfully (908). If there are differences (906), the differences and are identified and the synchronization client is prompted to perform any required recovery operations, e.g., to upload changes from the client that may not yet be reflected at the server and/or to download changes from the synchronization server (910).

In various embodiments, the verification techniques described herein enable client-centric, event-based synchronization to be performed while ensuring consistent state across synchronization set endpoints.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of synchronizing data, comprising:
monitoring, by one or more processors associated with a first synchronization client of a plurality of synchronization clients, a synchronization event stream with respect to one or more objects stored at the first synchronization client, wherein the synchronization event stream is provided to the plurality of synchronization clients by a synchronization server, individual ones of the plurality of synchronization clients store a master copy of the one or more objects, and the monitoring the synchronization event stream comprising:

querying the synchronization server for an indication of a most recent event sequence identifier corresponding to a synchronization event comprised in the synchronization event stream, the first synchronization client running code that queries the synchronization server at least in accordance with a predefined period of time;

determining, by the one or more processors, that the synchronization event stream includes one or more synchronization events for which synchronization has not been performed, the determining that the synchronization event stream includes the one or more synchronization events comprising:

determining whether the most recent event sequence identifier corresponds to a more recent synchronization event than a last synchronization event processed by the first synchronization client;

in response to a determination that the most recent event sequence identifier corresponds to the more recent synchronization event than the last synchronization event processed by the first synchronization client, communicating one or more queries with respect to one or more events of the synchronization event stream that are of interest to a user corresponding to the first synchronization client, the one or more queries pertaining to the one or more objects stored at the first synchronization client; and determining that the synchronization event stream includes the one or more synchronization events for which synchronization has not been performed based on a response to at least one of the one or more queries;

in response to determining that the synchronization event stream includes the one or more synchronization events for which synchronization has not been performed, performing, by the one or more processors, at the first synchronization client a synchronization based at least in part on the one or more synchronization events downloaded from the synchronization server; and verifying, by one or more processors, a result of the synchronization based on the synchronization event stream, comprising:

determining that a prescribed amount of time has passed since a last verification;

determining one or more computed representations of synchronization set state for the one or more objects stored at the first synchronization client, wherein the one or more computed representations are based at least in part on a result of hash function applied with respect to at least metadata for at least part of the synchronization set state; and comparing the one or more computed representations with one or more corresponding computed representations of synchronization set state as stored at the synchronization server.

2. The method of claim 1, wherein the comparison is performed by the first synchronization client.

3. The method of claim 1, wherein the synchronization server is configured to:

receive the one or more computed representations of the synchronization set state for the one or more objects stored at the first synchronization client;

compute the one or more corresponding representations of the synchronization set state as stored by the synchronization server; and compare the one or more computed representations received from the first synchronization client to the one or more corresponding computed representations of the synchronization set state as stored by the synchronization server.

4. The method of claim 3, wherein the synchronization server is configured to conclude that the synchronization set state as stored at the first synchronization client is verified based at least in part on comparing that the one or more computed representations received from the first synchronization client to the one or more corresponding computed representations of the synchronization set state as stored by the synchronization server.

5. The method of claim 1, further comprising concluding based on the comparison that the synchronization set state as stored at the first synchronization client is not correct if the one or more computed representations of synchronization set state as stored at the first synchronization client does not match the one or more corresponding computed representations of synchronization set state as stored at the synchronization server.

6. The method of claim 5, wherein the synchronization server is configured to prompt the first synchronization client to perform recovery operations based at least in part on said conclusion.

7. The method of claim 6, wherein the recovery operations involve at least one of: uploading changes from the first synchronization client to the synchronization server and downloading changes from the synchronization server to the first synchronization client.

8. The method of claim 1, wherein the verification processing is performed at a prescribed interval.

9. The method of claim 1, wherein the verification processing is performed based on detecting that an event or other trigger has occurred.

10. The method of claim 1, wherein the synchronization event stream is provided to the plurality of synchronization clients by the synchronization server.

11. The method of claim 1, wherein each of the plurality of synchronization clients check the synchronization event stream for synchronization events for which synchronization processing is to be performed with respect to synchronization objects respectively stored at each of the plurality synchronization clients.

12. The method of claim 1, wherein the synchronization event stream comprises a table that comprises a plurality of sequentially numbered synchronization events and corresponding one or more values associated with each of the plurality of sequentially numbered synchronization events.

13. The method of claim 1, wherein the performing the synchronization includes determining the one or more synchronization events to synchronize based at least in part on one or more event identifiers corresponding to the one or more synchronization events for which synchronization has not been performed, and at least one event identifier last processed by the first synchronization client.

14. The method of claim 1, wherein the performing the synchronization at the first synchronization client determining the one or more synchronization events to be downloaded from the synchronization server based at least in part on determining one or more synchronization events that are of interest to the user corresponding to the first synchronization client.

15. The method of claim 1, wherein: the synchronization event stream comprises a table that comprises a field indicating an object corresponding to the synchronization event, a field indicating an event type corresponding to the synchronization event, a field indicating a time associated with the synchronization event, and a field indicating a synchronization client with which the synchronization event is associated; and
   a determination that the synchronization event stream is based at least on the one or more fields corresponding to the synchronization event comprised in the table.

16. A system to synchronize data, comprising:
   a communication interface; and
   a processor associated with a first synchronization client of a plurality of synchronization clients, the processor coupled to the communication interface and configured to:
      monitor, at a synchronization client, a synchronization event stream with respect to one or more objects stored at the first synchronization client, wherein the synchronization event stream is provided to the plurality of synchronization clients by a synchronization server, individual ones of the plurality of synchronization clients store a master copy of the one or more objects, and to monitor the synchronization event stream comprising:
         query the synchronization server for an indication of a most recent event sequence identifier corresponding to a synchronization event comprised in the synchronization event stream, the first synchronization client running code that queries the synchronization server at least in accordance with a predefined period of time;
      determining, at a synchronization client, that the synchronization event stream includes one or more synchronization events for which synchronization has not been performed, to determine that the synchronization event stream includes the one or more synchronization events comprising:
         determine whether the most recent event sequence identifier corresponds to a more recent synchronization event than a last synchronization event processed by the first synchronization client;
         in response to a determination that the most recent event sequence identifier corresponds to the more recent synchronization event than the last synchronization event processed by the first synchronization client, communicate one or more queries with respect to one or more events of the synchronization event stream that are of interest to a user corresponding to the first synchronization client, the one or more queries pertaining to the one or more objects stored at the first synchronization client; and
         determine that the synchronization event stream includes the one or more synchronization events for which synchronization has not been performed based on a response to at least one of the one or more queries;
      in response to determining that the synchronization event stream includes the one or more synchronization events for which synchronization has not been performed, performing, at the first synchronization client, via the communication interface, a synchronization based at least in part on the one or more synchronization events downloaded from the synchronization server; and
   verifying a result of the synchronization based on the synchronization event stream, to verify the result comprises:
      determining that a prescribed amount of time has passed since a last verification;
      determine one or more computed representations of synchronization set state for the one or more objects stored at the first synchronization client, wherein the one or more computed representations are based at least in part on a result of hash function applied with respect to at least metadata for at least part of the synchronization set state; and
      compare the one or more computed representations with one or more corresponding computed representations of synchronization set state as stored at the synchronization server.

17. The system of claim 16, wherein the synchronization server is configured to:
   receive the one or more computed representations of the synchronization set state for the one or more objects stored at the first synchronization client;
   compute one or more corresponding representations of the synchronization set state as stored by the synchronization server; and
   compare the one or more computed representations received from the first synchronization client to the one or more corresponding computed representations of the synchronization set state as stored by the synchronization server.

18. The system of claim 17, wherein the synchronization server is configured to conclude that the synchronization set state as stored at the first synchronization client is verified based at least in part on comparing that the one or more computed representations received from the first synchronization client to the one or more corresponding computed representations of the synchronization set state as stored by the synchronization server.

19. The system of claim 16, wherein the processor is further configured to conclude based on the comparison that the synchronization set state as stored at the first synchronization client is not correct if the one or more computed representations of synchronization set state as stored at the first synchronization client does not match the one or more corresponding computed representations of synchronization set state as stored at the synchronization server.

20. The system of claim 19, wherein the processor is further configured to prompt the first synchronization client to perform recovery operations based at least in part on said conclusion.

21. The system of claim 20, wherein the recovery operations involve at least one of: uploading changes from the first synchronization client to the synchronization server and downloading changes from the synchronization server to the first synchronization client.

22. The system of claim 16, wherein the verification processing is performed at a prescribed interval.

23. The system of claim 16, wherein the verification processing is performed based on detecting that an event or other trigger has occurred.

24. A computer program product to synchronize data, the computer program product being embodied in a non-transitory computer readable storage medium and comprising computer instructions for:

monitoring, by one or more processors associated with a first synchronization client of a plurality of synchronization clients, a synchronization event stream with respect to one or more objects stored at the first synchronization client of a plurality of synchronization client, wherein the synchronization event stream is provided to the plurality of synchronization clients by a synchronization server, individual ones of the plurality of synchronization clients store a master copy of the one or more objects, and the monitoring the synchronization event stream comprising:
  querying the synchronization server for an indication of a most recent event sequence identifier corresponding to a synchronization event comprised in the synchronization event stream, the first synchronization client running code that queries the synchronization server at least in accordance with a predefined period of time;
determining, by the one or more processors, that the synchronization event stream includes one or more synchronization events for which synchronization has not been performed, the determining that the synchronization event stream includes the one or more synchronization events comprising:
  determining whether the most recent event sequence identifier corresponds to a more recent synchronization event than a last synchronization event processed by the first synchronization client;
  in response to a determination that the most recent event sequence identifier corresponds to the more recent synchronization event than the last synchronization event processed by the first synchronization client, communicating one or more queries with respect to one or more events of the synchronization event stream that are of interest to a user corresponding to the first synchronization client, the one or more queries pertaining to the one or more objects stored at the first synchronization client; and
  determining that the synchronization event stream includes the one or more synchronization events for which synchronization has not been performed based on a response to at least one of the one or more queries;
  in response to determining that the synchronization event stream includes the one or more synchronization events for which synchronization has not been performed, performing, by the one or more processors, performing at the first synchronization client a synchronization based at least in part on the one or more synchronization events downloaded from the synchronization server; and
verifying, by one or more processors, a result of the synchronization based on the synchronization event stream, comprising
  determining one or more computed representations of synchronization set state for the one or more objects stored at the first synchronization client, wherein the one or more computed representations are based at least in part on a result of hash function applied with respect to at least metadata for at least part of the synchronization set; and
  comparing the one or more computed representations with one or more corresponding computed representations of synchronization set state as stored at the synchronization server.

25. The computer program product of claim 24, wherein the synchronization server is configured to:
  receive the one or more computed representations of the synchronization set state for the one or more objects stored at the first synchronization client;
  compute one or more corresponding representations of the synchronization set state as stored by the synchronization server; and
  compare the one or more computed representations received from the first synchronization client to the one or more corresponding computed representations of the synchronization set state as stored by the synchronization server.

26. The computer program product of claim 24, further comprising computer instructions to conclude based on the comparison that the synchronization set state as stored at the first synchronization client is not correct if the one or more computed representations of synchronization set state as stored at the first synchronization client does not match the one or more corresponding computed representations of synchronization set state as stored at the synchronization server.

* * * * *